UNITED STATES PATENT OFFICE.

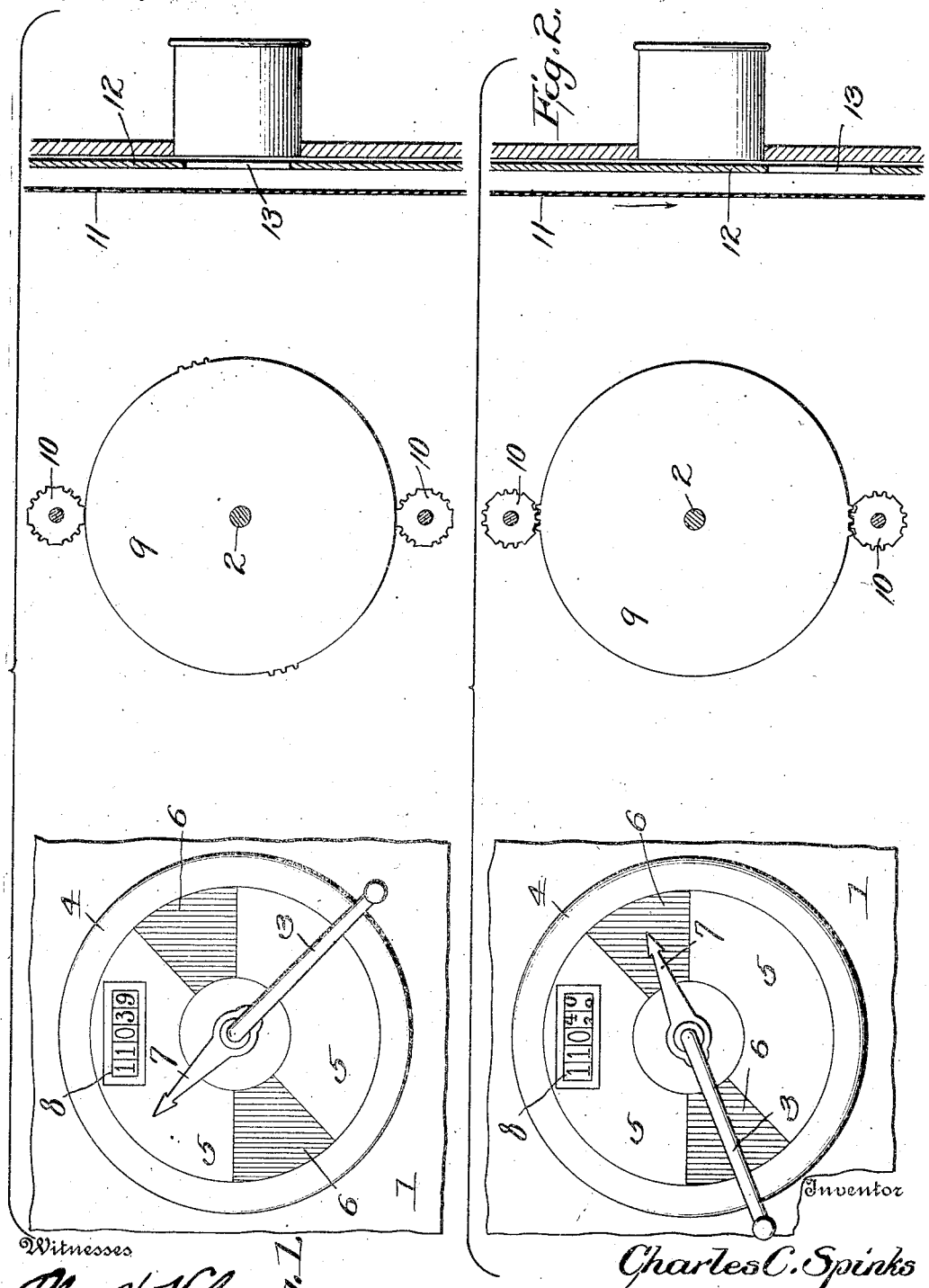

CHARLES C. SPINKS, OF MEMPHIS, MISSOURI.

ATTACHMENT FOR MOVING-PICTURE DEVICES.

1,002,464.  Specification of Letters Patent.  Patented Sept. 5, 1911.

Application filed October 22, 1909. Serial No. 524,070.

*To all whom it may concern:*

Be it known that I, CHARLES C. SPINKS, a citizen of the United States, residing at Memphis, in the county of Scotland and State of Missouri, have invented a new and useful Improvement in Attachments for Moving-Picture Devices, of which the following is a specification.

This invention relates to an attachment for moving picture cameras, although it can also be used if desired in connection with moving picture machines in the exhibition of prints taken from the original negative.

The invention relates specifically to an indicating device employed in connection with a camera having a shutter and an intermittently fed film, the said film remaining stationary when the shutter is open and moving one step when the shutter is in closed position.

The object of said indicator is to show the exact position of the shutter and the travel of the film, and also to indicate their exact relation to each other during the process of taking the picture.

The invention consists in the novel features of construction hereinafter described, pointed out in the claim and shown in the accompanying drawing, in which:

Figure 1 is a diagrammatic view, the indicator being shown in front elevation and certain portions of the mechanism being shown, with parts in section for the purpose of indicating the relation between the indicator and the film and shutter. Fig. 2 is a similar view parts being shown in position occupied during movement of the film.

In these drawings 1 represents a side of the camera box and through said box passes a drive shaft 2, provided at one end with an operating handle 3. In the side of the box is fixed a dial plate 4 of any suitable material and said plate is divided into sector-portions 5 and 6, the sectors 5 being of a light color and the sector portions 6 being dark or shaded, as indicated in the drawing. The light portions 5 correspond to the period of illumination, either of a film when used in connection with a camera or of a screen when used in connection with a projecting apparatus, and therefore have a greater surface area than the shaded portions 6, which portions represent the duration of time during which the shutter is closed. Fixed upon the shaft 2 is a hand 7 which travels over said dial plate and as will hereafter be seen the position of this hand with respect to the light and shaded portions 5 and 6 will indicate the position of the shutter. A registering device 8 of any desired kind is fitted into the dial plate and indicates the number of exposures made of the film and also by its travel indicates the relation between the film and the shutter, as will hereafter appear. The register 8 is connected by any suitable form of gearing with the film feed mechanism. The shaft 2 carries also a mutilated gear 9 which meshes with suitable film feeding gears 10 so that there will be two movements of the film for each revolution of the shaft 2. To more fully illustrate the connection between the indicating device and the film and shutter I have shown portions of the latter in section, the film 11 being movable downwardly step by step and the shutter 12, which has a central opening 13 being moved vertically by any desired means operated from the shaft 2. As seen from Fig. 1 when the shutter 12 is in open position the film feed mechanism is stationary and the index hand 7 is traveling over one of the light or uncolored portions 5. As said index hand reaches a shaded portion 6 the mutilated gear 9 comes into mesh with the feed gears 10, the shutter has moved to closed position, the film is feeding downwardly as indicated by the arrow in Fig. 2 and the register 8 is also operating in order to indicate another exposure.

It will be obvious that if at any time there is any slipping of the film or irregular movement of the shutter the same will be indicated by the index hand 7, as any movement of the registering device when the hand 7 is over one of the portions 5 will at once indicate a movement of the film while the shutter is in open position. It is of course understood that all parts are so geared that the film and shutter, the hand 7 and the register 9 will coöperate as long as the mechanism is in proper working condition, and any defect in said mechanism will be indicated, thereby enabling the operator to stop the machine and save unused portions of a film.

What I claim as new and desire to secure by Letters Patent is:

In a device of the kind described a central shaft, means operable by rotation of said shaft for imparting an intermittent movement to a film, a shutter, a dial plate through which said shaft passes and an index hand carried by said shaft and traveling upon said dial plate for the purpose of indicating the relative position of the shutter and film.

CHARLES C. SPINKS.

Witnesses:
 ALFRED R. CHOVINARD,
 MEYER SCHOEN.